United States Patent
Kalyanaraman et al.

(10) Patent No.: US 9,917,810 B2
(45) Date of Patent: Mar. 13, 2018

(54) COMMON AGGREGATOR FRAMEWORK FOR SMS AGGREGATORS

(71) Applicant: Oracle International Corporation, Redwood Shores, CA (US)

(72) Inventors: Suresh Kumar Kalyanaraman, Bangalore (IN); Taran Deep Arora, Bangalore (IN); Sandeep Kumar Gain, Bangalore (IN); Gaurav Mathur, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 173 days.

(21) Appl. No.: 14/564,658

(22) Filed: Dec. 9, 2014

(65) Prior Publication Data
US 2016/0164824 A1    Jun. 9, 2016

(51) Int. Cl.
*H04L 12/58* (2006.01)
*H04W 4/14* (2009.01)

(52) U.S. Cl.
CPC .............. *H04L 51/38* (2013.01); *H04W 4/14* (2013.01)

(58) Field of Classification Search
CPC .................................. H04L 51/38; H04W 4/14
USPC ........................................................ 709/206
See application file for complete search history.

(56) References Cited

U.S. PATENT DOCUMENTS

| | | | |
|---|---|---|---|
| 5,826,239 A | 10/1998 | Du et al. | |
| 7,873,376 B2 * | 1/2011 | Coelho | H04W 4/14 455/406 |
| 8,090,612 B2 | 1/2012 | Chao et al. | |
| 8,417,678 B2 | 4/2013 | Bone | |
| 8,510,264 B1 | 8/2013 | Tamm et al. | |
| 8,719,225 B1 | 5/2014 | Rath | |
| 8,775,448 B2 | 7/2014 | Tuatini et al. | |
| 8,869,256 B2 * | 10/2014 | Sample | H04L 12/5835 726/5 |

(Continued)

FOREIGN PATENT DOCUMENTS

WO    WO 03036420 A2    5/2003

OTHER PUBLICATIONS

International Search Report and Written Opinion dated Oct. 15, 2015 for related PCT Patent Application No. PCT/US2015/040225, 11 pages.

(Continued)

*Primary Examiner* — Kevin Bates
*Assistant Examiner* — Nazia Naoreen
(74) *Attorney, Agent, or Firm* — Vista IP Law Group, LLP

(57) ABSTRACT

A method, system, and computer program product for short messaging service (SMS) aggregation system setup. A computing platform (e.g., a server, a multi-processor server, a cloud array, a processor, etc.) is configured to receive messages over a network (e.g., an aggregator carrier network) and to deliver the messages to a processing entity executing on the computing platform. The processing entity receives messages comprising a set of SMS configuration parameters such as SMS configuration parameters to identify an SMS aggregator identifier and SMS configuration parameters comprising an aggregator network type and/or an aggregator carrier name. The SMS configuration parameters are stored for later retrieval and used when formatting and sending SMS messages.

20 Claims, 11 Drawing Sheets

(56) References Cited

U.S. PATENT DOCUMENTS

| | | | |
|---|---|---|---|
| 9,031,586 B1* | 5/2015 | Kilpatrick | H04W 4/18 455/466 |
| 9,247,401 B2* | 1/2016 | Lauder | H04W 4/14 |
| 9,754,265 B2 | 9/2017 | Seelig | |
| 2003/0144898 A1 | 7/2003 | Bibelnieks et al. | |
| 2004/0015504 A1 | 1/2004 | Ahad | |
| 2004/0204973 A1 | 10/2004 | Witting et al. | |
| 2005/0192986 A1 | 9/2005 | Butler | |
| 2005/0259575 A1 | 11/2005 | Krishnamurthi | |
| 2006/0053181 A1 | 3/2006 | Anand | |
| 2006/0253318 A1 | 11/2006 | Ramsey et al. | |
| 2007/0156842 A1 | 7/2007 | Vermeulen | |
| 2007/0208602 A1 | 9/2007 | Nocera et al. | |
| 2007/0250505 A1 | 10/2007 | Yang et al. | |
| 2008/0027788 A1 | 1/2008 | Lawrence et al. | |
| 2008/0040191 A1 | 2/2008 | Chakravarty et al. | |
| 2008/0065435 A1 | 3/2008 | Ratzloff | |
| 2008/0262925 A1 | 10/2008 | Kim et al. | |
| 2010/0070448 A1 | 3/2010 | Omoigui | |
| 2010/0250477 A1 | 9/2010 | Yadav | |
| 2010/0274661 A1 | 10/2010 | Aaltonen et al. | |
| 2011/0099152 A1 | 4/2011 | Law | |
| 2011/0282735 A1 | 11/2011 | Kordis et al. | |
| 2012/0130802 A1 | 5/2012 | Shimizu | |
| 2012/0173340 A1 | 7/2012 | Zhao | |
| 2012/0191546 A1 | 7/2012 | Phelan et al. | |
| 2014/0181039 A1 | 6/2014 | Harrison | |
| 2014/0181579 A1 | 6/2014 | Whitehead | |
| 2015/0026236 A1 | 1/2015 | Solter | |
| 2015/0038181 A1 | 2/2015 | Magadevan | |

OTHER PUBLICATIONS

Edith Cohen, et al., "Refreshment policies for Web content caches", Computer Networks, Nov. 8, 2001, 14 pages.
Non-final Office Action dated Dec. 21, 2015 for related U.S. Appl. No. 14/029,390.
Alkis Simitsis, "Optimizing Analytic Data Flows for Multiple Execution Engines", May 20-24, 2012.
Notice of Allowance and Fee(s) due dated May 3, 2016 for related U.S. Appl. No. 14/029,390.
Notice of Allowance and Fee(s) due dated May 27, 2016 for related U.S. Appl. No. 12/985,269.
Non-Final Office Action for U.S. Appl. No. 12/985,269 dated Feb. 27, 2013.
Final Office Action for U.S. Appl. No. 12/985,269 dated Sep. 24, 2013.
Advisory Action for U.S. Appl. No. 12/985,269 dated Jan. 16, 2014.
Advisory Action for U.S. Appl. No. 12/985,269 dated Dec. 13, 2013.
Non-Final Office Action for U.S. Appl. No. 13/229,610 dated Oct. 4, 2013.
Non-Final Office Action for U.S. Appl. No. 13/229,610 dated Jul. 18, 2012.
Final Office Action for U.S. Appl. No. 13/229,610 dated Jan. 31, 2013.
Non-final Office Action dated Jul. 10, 2014 for U.S. Appl. No. 12/985,269.
Non-final Office Action dated Oct. 17, 2014 for U.S. Appl. No. 13/229,610.
Final Office Action dated Oct. 30, 2014 for U.S. Appl. No. 12/985,269.
Non-final Office Action Apr. 6, 2015 for U.S. Appl. No. 12/985,269.
Final Office Action dated May 26, 2015 for U.S. Appl. No. 13/229,610.
Final Office Action dated Jul. 22, 2015 for related U.S. Appl. No. 12/985,269.
Non-final Office Action dated Sep. 25, 2015 for related U.S. Appl. No. 13/229,610.
FrancescoChemolli, SquidFaq, InnerWorkings, Squid Web Proxy Wiki, Oct. 27, 2013, 17 pages.
Twilio, Inc., "TwiML Message: Twilio's Request", Mar. 26, 2013, 2 pages.
Mobivate, "psms aggregator", Jan. 14, 2013, 3 pages.
Ford, "IT Research BYTE" LOL: Laugh out Loud or Lots of Love? Integrating SMS into Ford Business Processes, Jun. 25, 2010, 6 pages.
Tata Communications, "Mobile Messaging Exchange", 2013, 2 pages.
ExactTarget, "SMS Marketing Term of the Day: Aggregator", Jun. 30, 2009, 3 pages.
Aruhat, "SMS Aggregators: Make sure that your gateways are the best used to give Excellent Services", Mar. 28, 2014, 6 pages.
Non-final Office Action dated Jan. 22, 2016 for related U.S. Appl. No. 12/985,269.
Advisory Action dated Jul. 7, 2017 for related U.S. Appl. No. 13/229,610.
Advisory Action dated Jul. 21, 2017 for related U.S. Appl. No. 13/229,610.
Notice of Allowance and Fee(s) due dated Oct. 19, 2017 for related U.S. Appl. No. 14/798,293.
Non-final Office Action dated Nov. 30, 2017 for U.S. Appl. No. 14/798,268.

* cited by examiner

COMMON AGGREGATOR FRAMEWORK FOR SMS AGGREGATORS

FIELD

This disclosure relates to the field of short messaging service (SMS) aggregation system setup and more particularly to a protocol and schema to implement an SMS aggregator configuration using a set of configuration parameters.

BACKGROUND

Various marketing organizations (brand marketing organizations, direct response marketing organizations, etc.) rely on the ability to send SMS messages to targeted users. In many cases such marketing organizations use commercially available systems such as enterprise modules, SMS aggregators and SMS carriers to perform the actual sending and receiving of SMS messages to/from targeted users.

The aforementioned enterprise modules, SMS aggregators, and SMS carriers need to be integrated together. The setup and configuration of portions of the integrated system (e.g., comprising one or more enterprise modules and one or more SMS aggregators) can be cumbersome, requiring a considerable amount of time (e.g., in the range of three calendar months) and requiring significant engineering resources (e.g., at least two full-time resources) to integrate an enterprise module with an aggregator.

This presents a latency and cost problem. Specifically, the use of various applications from various application providers (e.g., Responsys SMS, Exact Target etc.) that integrate with an SMS aggregator to send/receive SMS messages might be delayed until the required engineering resources have been identified and deployed, and delayed still longer until the integration engineering work has been completed and tested. In some cases, there may be hundreds of SMS aggregators and telecom providers. This would mean that the application providers would need to identify and deploy sufficient engineering resources to write partner-specific code on a per-aggregator basis. The corresponding investment in product development, testing and deployment becomes high, and continues to get higher as more people become connected and as more SMS aggregators fragment throughout geographies and throughout emerging economies.

Techniques are needed address the problem of establishing a new SMS aggregator into an internet messaging system. None of the aforementioned legacy approaches achieve the capabilities of the herein-disclosed techniques for computer-implemented SMS aggregator configuration. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for computer-implemented SMS aggregator configuration. The claimed embodiments address the problem of establishing a new SMS aggregator into an internet messaging system. More specifically, some embodiments are directed to approaches for implementing a parameterized system that can be configured through application programming interface calls, which embodiments advance the technical fields for addressing the problem of establishing a new SMS aggregator into an internet messaging system, as well as advancing peripheral technical fields. Some embodiments and techniques thereto improve the functioning of multiple systems within the disclosed environments.

A computing platform (e.g., a server, a multi-processor server, a cloud array, a processor, etc.) is configured to receive messages over a network (e.g., an aggregator carrier network) and to deliver the messages to a task executing on the computing platform. The task receives messages comprising a set of SMS configuration parameters such as SMS configuration parameters to identify an SMS aggregator identifier and SMS configuration parameters comprising an aggregator network type, and/or an aggregator carrier name. One or more processes are configured to process an HTTP GET or HTTP POST, and then to process a form field and/or a JSON message and/or an XML string (e.g., to extract various SMS configuration parameters). The SMS configuration parameters are stored for later retrieval.

Further details of aspects, objectives, and advantages of the disclosure are described below and in the detailed description, drawings and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

DETAILED DESCRIPTION

Figure 1:
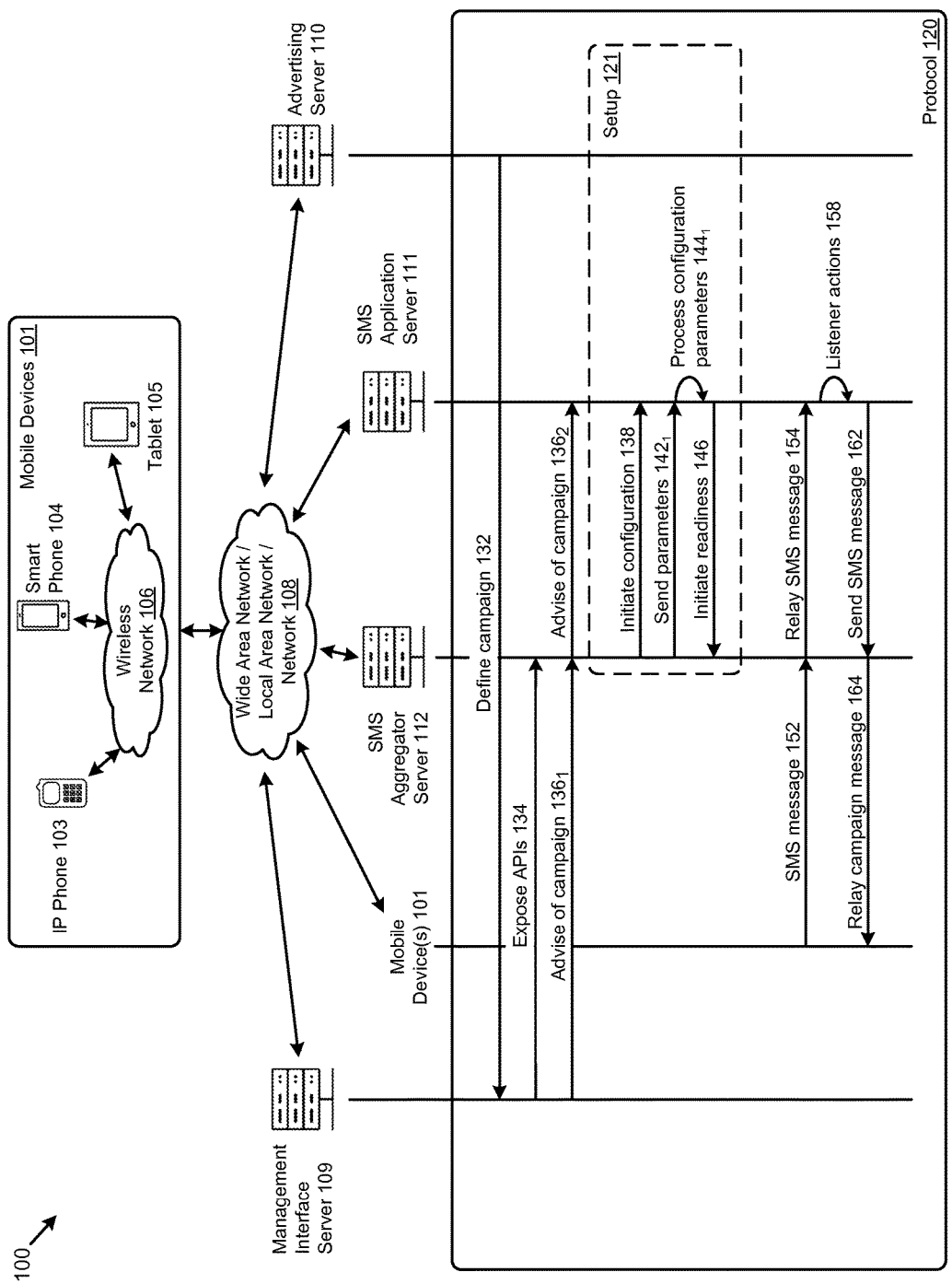
FIG. 1 depicts an Internet advertising- and Internet messaging-centric environment in which various forms of SMS aggregator integration can operate.

Some embodiments of the present disclosure address the problem of establishing a new SMS aggregator into an internet messaging system and some embodiments are directed to approaches for implementing a parameterized system that can be configured through application programming interface calls. More particularly, disclosed herein and in the accompanying figures are exemplary environments, methods and systems for using a computer-implemented SMS aggregator configuration protocol.

Overview

Disclosed herein are techniques to integrate an SMS marketing application with an SMS aggregator by using configuration parameters rather than requiring code changes. The disclosed protocol and schema relieves the product development team from "on boarding" a new aggregator by writing new aggregator-specific code. Instead, the disclosed protocol and schema on-boards a new SMS aggregator by configuring only a small number of entries in a configuration parameter set, which in turn are used to map input, output, and processing parameters that support SMS messaging (e.g., messaging to/from an aggregator and their SMS subscribers, messaging from an SMS aggregator to/from an enterprise application, etc.).

The disclosed materials defines a schema for data representation, and defines an application programming interface (API) and a protocol for use of the APIs. The schema, protocol and APIs serve to (1) define a set of parameters, (2) send and receive such parameters in accordance with a protocol, and (3) map and/or transform those inputs into aggregator-specific API parameters during runtime. The set of parameters are declaratively defined in a dataset (e.g., a database table, a file, etc.). The scope of the parameters and their semantics enable systems according to the disclosure hereunder to send/receive SMS messages via any known aggregator.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1 depicts an Internet advertising- and Internet messaging-centric environment 100 in which various forms of SMS aggregator integration can operate. As an option, one or more instances of environment 100 or any aspect thereof may be implemented in the context of the architecture and functionality of the embodiments described herein. Also, the environment 100 or any aspect thereof may be implemented in any desired environment.

The environment shown in FIG. 1 supports the shown protocol 120. The protocol 120 includes messaging between the shown computing resources. Any of the computing resources (e.g., an SMS aggregator server 112, an SMS application server 111, an advertising server 110, mobile devices 101, etc.) can communicate with any mobile devices (e.g., IP phone 103, smart phone 104, tablet 105, etc.) over network 108 and/or over wireless network 106. The protocol can be executed one or more times during the course of a marketing and advertising campaign. For example, an advertiser operating an advertising server 110 might define an advertising campaign, and then send characteristics of the advertising campaign to another computing resource such as an SMS application server 111 or (as shown) that then sends the message to a management interface server 109 (see message 132). The receiving computing resource then exposes APIs (see message 134), which can be performed by publishing a description of the APIs or by sending a library or package or by providing a description of the services underlying the APIs (e.g., by defining one or more web services, and/or by publishing a WSDL file). Continuing, the receiving computing resource can advise an SMS aggregator of the existence and nature of the advertiser's campaign (see message $136_1$). The existence and nature of the advertiser's campaign can further be forwarded to an SMS application server (see message $136_2$). The SMS application server can host any of the aforementioned enterprise applications.

As shown, the SMS aggregator can initiate messaging within protocol 120 so as to initiate setup of the SMS application server (e.g., to configure an instance of an enterprise application). The SMS aggregator's participation in setup 121 comprises sending a message to initiate a configuration session (see message 138), sending one or more messages to send parameters (see message $142_1$), and receiving a message from the SMS application server (see message 146) by which the SMS application server indicates that it has processed the given configuration parameters (see operation $144_1$) and is ready to prosecute a campaign.

Prosecuting an advertising campaign comprises one or another forms of marketing to a target audience so as to engage a mobile device user to send an SMS message in response to some advertising stimulus. As shown, a user of one or more mobile device(s) (e.g., mobile device $101_1$, mobile device $101_N$, etc.) sends an SMS message (see message 152), which is received by the SMS aggregator and relayed (see message 154) to the SMS application server, which in turn responds to the incoming SMS message and performs various actions before sending an SMS message back to the mobile device user. For example, an advertiser might want to reach a user who is in the process of buying a case of beer (e.g., to upsell a newly introduced beer product). The advertiser or their agents might place a sign or placard next to the beer display in the supermarket, and entice the user to text a short code such as "123456" to a particular number in order to have a coupon to be delivered to the user's mobile device. The user might indeed do so (e.g., see message 152), and the SMS application server's receipt of the short code or abstract of the sent SMS message (see message 154) might invoke listener actions (see listener actions 158). The listener actions might include sending additional SMS messages to the SMS aggregator (see message 162), which might be relayed on to the mobile device user (see message 164). Additional aspects of the nature and extent of listener actions are further described below. Moreover, messaging and operations involved in setup and prosecution of an advertising campaign is shown and described as pertains to the following FIG. 2.

Figure 2:
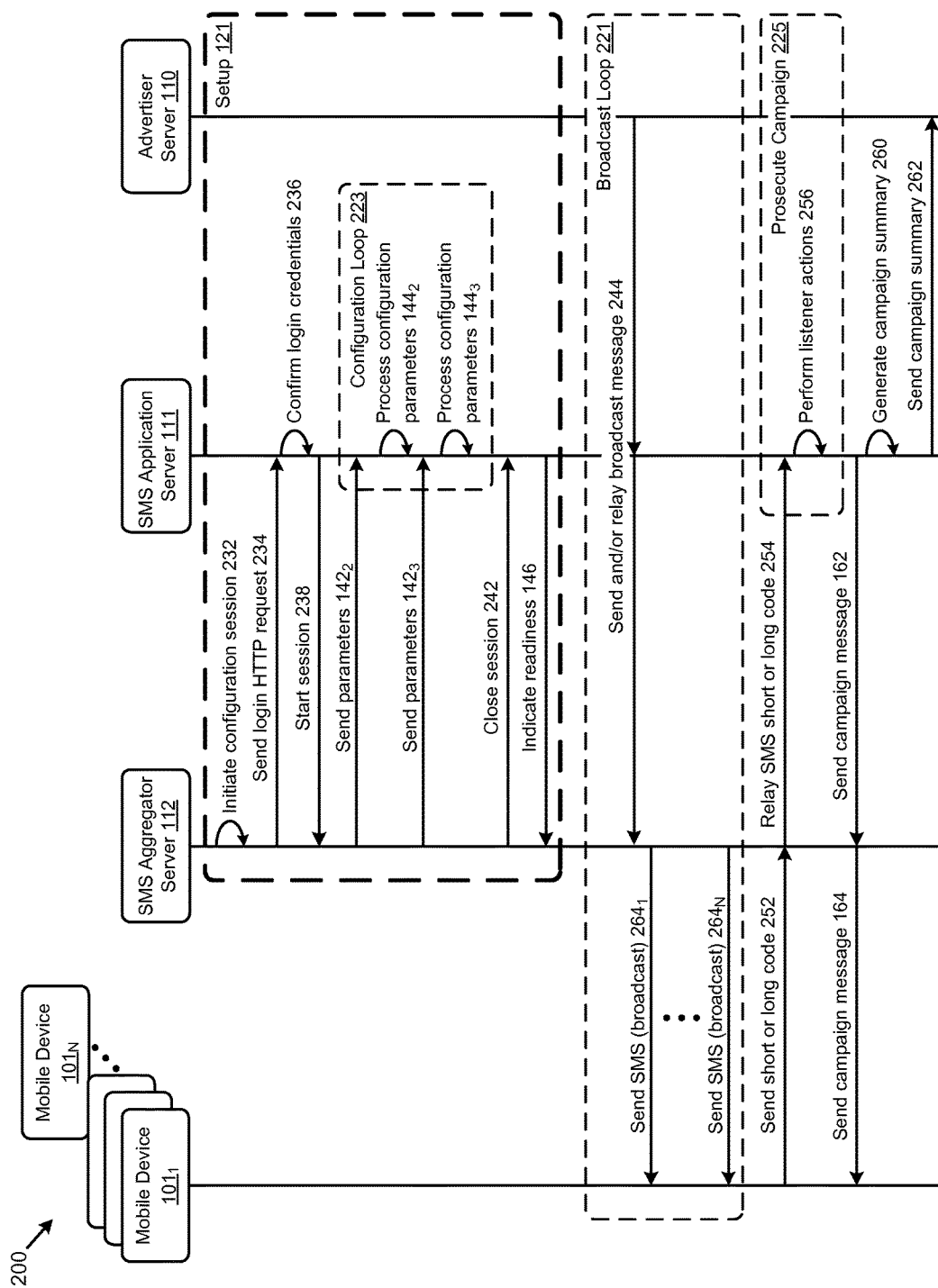
FIG. 2 presents a protocol for setup and operation of a messaging infrastructure based on a computer-implemented SMS aggregator configuration schema, according to one embodiment.

FIG. 2 presents a protocol 200 for setup and operation of a messaging infrastructure based on a computer-implemented SMS aggregator configuration schema. As an option, one or more instances of protocol 200 or any aspect thereof may be implemented in the context of the architecture and functionality of the embodiments described herein. Also, the protocol 200 or any aspect thereof may be implemented in any desired environment.

FIG. 2 depicts a portion of a setup protocol (see setup 121) and a portion of a protocol to operate over a campaign configuration (see prosecute campaign 225). Referring to the setup, the SMS aggregator would initiate a configuration session (see message 232) by initializing data structures and sending a login request, possibly by sending an HTTP request to the SMS application server (see message 234). The SMS application server can confirm login credentials for the SMS aggregator (see operation 236), and can then send a message to the requestor to start an authenticated session (see message 238). Once the session has been authenticated, a configuration loop 223 can commence. Any number of iterations may occur where the SMS aggregator server sends one or more parameters (see send parameters message $142_2$), which are in turn processed by the SMS application server (see process configuration parameters operation $144_2$). Iterations continue (see message $142_3$ and see operation $144_3$) until the session is closed by the SMS aggregator server when there are no more parameters to configure in the then current session (see message 242). At some point thereafter, the SMS application server will acknowledge the end of the session and indicate readiness to prosecute the campaign (see message 146).

In some situations the advertising campaign may include a broadcast (see message 244). Such a broadcast request (e.g., by the advertiser) can direct the SMS aggregator to initiate sending many SMS messages to a broadcast audience (see broadcast loop 221). As shown, an SMS broadcast message is sent to a plurality of mobile devices (e.g., see broadcast message $264_1$, broadcast message $264_N$, etc.). The advertiser hopes that the broadcasted message (or other messaging as may make an impression of a targeted user) will spur the targeted user to engage with the advertiser, for example, by sending a short code to a particular number. As shown, the user of mobile device 101 sends an SMS message (e.g., comprising a short code) to a particular number (e.g., to the SMS aggregator). When the broadcasting has completed (see broadcast loop 221), the SMS aggregator may receive a reaction from a user in the form of an SMS (see message 252), and the SMS aggregator will in turn relay the contents or abstract of the short code to the SMS application server (see message 254). The SMS application server prosecutes the campaign (see operation 225) by taking actions based on the short code. More particularly, the SMS application server prosecutes the campaign (see operation 225) by taking actions (e.g., see perform listener actions 256) based one or more listeners that respond upon receipt of a particular short code or abstract therefrom. Such actions may invoke still further actions such as sending a campaign message (see message 162), which might in turn be relayed to a mobile device (see message 164).

When the campaign has progressed for some duration, or when the campaign has ended, the SMS application server can calculate a campaign summary (see operation 260), and can send the campaign summary (see message 262) to the advertiser via the advertising server 110. Messaging in and out of the SMS application server and operations performed by the SMS application server can be distributed to various computing resources, and/or can be partitioned to be performed by some combination of computing resources. One such assignment and partitioning is shown and discussed as pertains to the interconnected components of FIG. 3.

Figure 3:
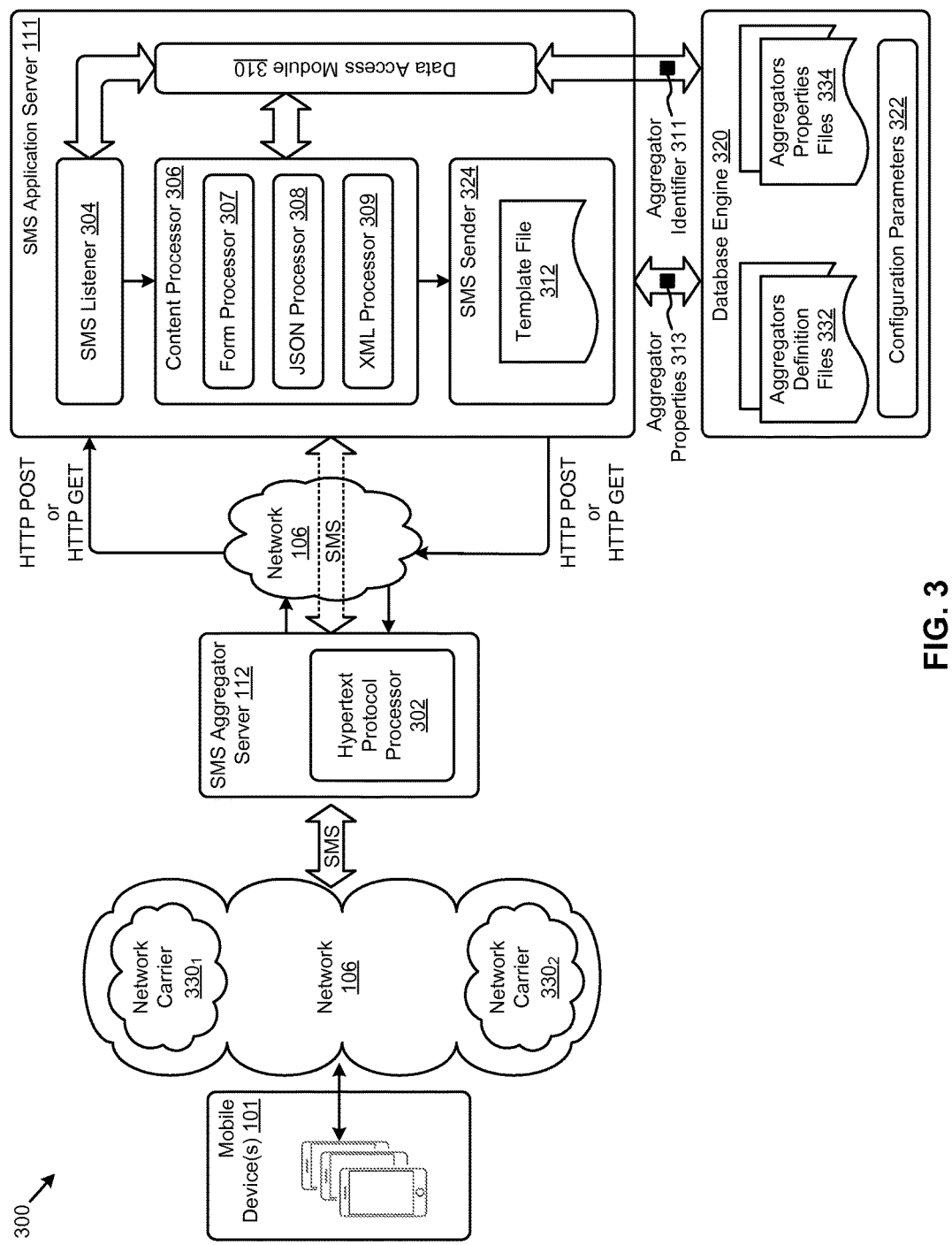
FIG. 3 is a block diagram showing interconnected components of an advertising and messaging system based on a computer-implemented SMS aggregator configuration schema, according to some embodiments.

FIG. 3 is a block diagram of interconnected components 300 of an advertising and messaging system based on a computer-implemented SMS aggregator configuration schema. As an option, one or more instances of interconnected components 300 or any aspect thereof may be implemented in the context of the architecture and functionality of the embodiments described herein. Also, the interconnected components 300 or any aspect thereof may be implemented in any desired environment.

As shown, the block diagram depicts mobile-originated (MO) messages that are sent from a user's mobile device (e.g., IP phone 103, smart phone 104, tablet 105, etc.) to an SMS aggregator server 112 over wireless network 106 (see path through network carrier $330_1$) and onward to an SMS application server 111, which in turn responds by configuring one or more mobile-terminated (MT) messages that are sent by the aggregator to a user's mobile phone (see path through network carrier $330_2$). In exemplary embodiments, the MO messages comprise a shortcode (e.g., 5 or 6 digits) and/or a longcode (e.g., a special telephone number), which is used to send messages to and receive messages from mobile devices.

In this embodiment, the SMS aggregator server 112 sends a mobile-originated message to a preconfigured URL (e.g., via an HTTP POST or an HTTP GET), which in turn references to an SMS listener component. Such an SMS listener component can be implemented as a Java listener, or as a web service, or as program code using any known techniques. As shown, an SMS listener 304 component is hosted on the SMS application server which in turn is interconnected to other computing devices on a network (e.g., an SMS marketing application network). The aforementioned URL and/or the formatting of the HTTP POST or GET has an SMS aggregator name in the path. The name can be a name or an abbreviation or an IP address or any other form of an aggregator identifier 311.

The SMS listener accesses a data access module 310 which in turn accesses a database engine 320. The SMS listener stores or causes to be stored the aggregator identifier 311 in a non-volatile or volatile area within the database engine. Further operations are performed by a content processor 306. For example, a content processor 306 will use the aggregator identifier 311 to access sets of aggregator details. In the embodiment shown the content processor 306 retrieves aggregator definitions from one or more instances of aggregators definition files 332 and/or can retrieve aggregator properties 313 from one or more aggregators properties files 334.

The content processor is further configured to respond to directives from the SMS listener(s). Strictly as an example in one embodiment, a content processor can access (e.g., based on the incoming HTTP POST or GET) a corresponding aggregators definition files 332 and/or can retrieve aggregator properties from one or more aggregators properties files 334. The content processor use the aggregator identifier and/or data derived from the aggregator identifier to steer data or instructions to one or more special-purpose processors. In this example, the value of a content_type property (see FIG. 4A) is used to steer instructions to the special-purpose processors comprising: (1) an XML processor 309, (2) a JSON processor 308, and (3) a form processor 307. The aforementioned special-purpose processors operate as follows:

1. The XML processor reads configuration properties (e.g., as defined in the aggregators properties file). In some embodiments, the configuration properties are defined so as to be retrieved via XPath or XQuery. The XML processor may further parse any incoming XML strings in the HTTP POST or GET payload so as to construct an outgoing message object.
2. The JSON processor reads the properties and parses an incoming JSON string in the HTTP payload to construct an MOMessage object.
3. The form processor reads the properties and parses the form fields and/or incoming request parameters either in a query string or in a POST payload string to construct an MOMessage object.

The objects generated by the content processor (e.g., by any of the special-purpose processors) is used in subsequent processing by the SMS sender 324. More particularly, and as shown, messages to a user mobile device can be processed by an SMS application server, and might operate as follows:

An SMS application (e.g., an SMS application hosted on an SMS application server) sends a JSON MT request with the name of the aggregator and the SMS message content, the mobile telephone number, short code, etc. to the SMS sender component.
1. The SMS sender reads the configuration parameters 322 to get the aggregator-specific properties.
2. Based on the configuration properties, for example as may be found within a template file 312, the SMS sender sends the appropriate HTTP request to the aggregator URL (see POST URL). Strictly as one example, the SMS sender might retrieve advertising messages from a database, where the retrieved advertising message corresponds to an advertiser's campaign (e.g., a message, a coupon, a creative advertisement, etc.) pertaining to the sent short code (e.g., by using the short code as a lookup value to retrieve the advertiser's campaign.
3. The SMS aggregator server then sends the HTTP request to the targeted mobile device 101 via the network carrier $330_2$. The targeted mobile device 101 might receive and display a coupon. The SMS aggregator server may implement a hypertext protocol processor 302 to process incoming or outgoing HTTP exchanges.

The foregoing description is merely one embodiment. Other embodiments, and additional aspects that may or may not be present in the depiction of FIG. 3 are as follows:
1. SMS aggregators can be configured to support HTTP or HTTPS protocols to send and receive SMS messages.
2. The user sends an MO message that to a shortcode or longcode.
3. The carrier network receives shortcode and sends onward to an SMS aggregator.
4. The SMS aggregator complies with the aforementioned APIs and sends the MO message to a configured URL, which points to the SMS listener.
5. The SMS listener consults an in-memory file to read MO properties for the particular aggregator.
6. The SMS Listener uses the content_type property to take actions.
7. The MOMessage object is then passed to the SMS application, which consumes the message and processes it further according to its application logic.
8. The SMS application server, possibly in conjunction with an advertiser server, forms an outgoing SMS message and delivers it to the mobile device.

The aforementioned instances of an aggregator definition and/or an aggregator property can be stored in any known format, and using any known storage technique. An example instance of an aggregator definition document is given in the following FIG. 4A. An example instance of an aggregator property document is given in FIG. 4B.

Figure 4A:
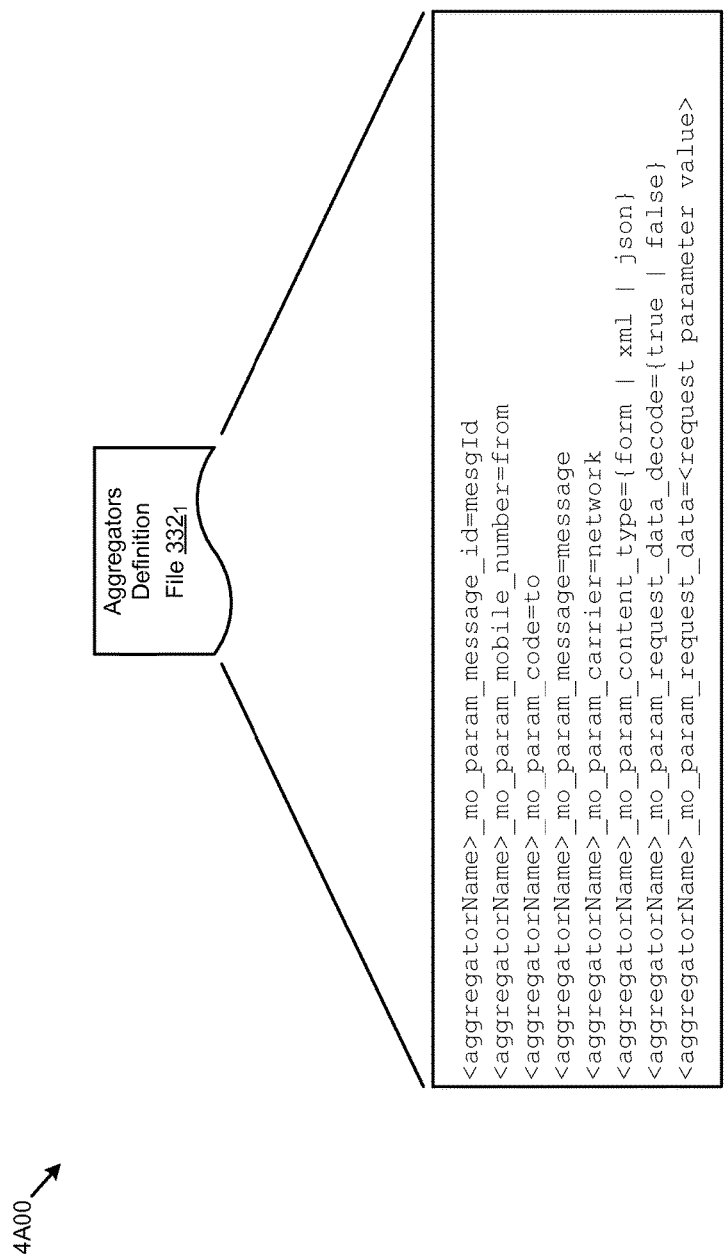
FIG. 4A presents a sample SMS aggregator definition document used to set up an advertising and messaging system based on a computer-implemented SMS aggregator configuration protocol, according to some embodiments.

FIG. 4A presents a sample SMS aggregator definition document 4A00 used to set up an advertising and messaging system based on a computer-implemented SMS aggregator configuration protocol. As an option, one or more instances of sample SMS aggregator definition document 4A00 or any aspect thereof may be implemented in the context of the architecture and functionality of the embodiments described herein. Also, the sample SMS aggregator definition document 4A00 or any aspect thereof may be implemented in any desired environment.

An aggregator definition document format (e.g., aggregators definition file $332_1$) can include many parameters. An example of such parameters and exemplary value semantics are given as follows:

| Parameter Name | Value |
|---|---|
| <aggregatorName>_mo_param_message_id | <mesgId> |
| <aggregatorName>_mo_param_mobile_number | <from> |
| <aggregatorName>_mo_param_code | <to> |
| <aggregatorName>_mo_param_message | <message> |
| <aggregatorName>_mo_param_carrier | <network> |
| <aggregatorName>_mo_param_content_type | {form \| xml \| json} |
| <aggregatorName>_mo_param_request_data_decode | {true \| false} |
| <aggregatorName>_mo_param_request_data | <request parameter value> |

Referring to the depiction of FIG. 4A, the value of "<aggregatorName>" will be replaced by the name or other identifier of the aggregator.

Figure 4B:
FIG. 4B presents a sample SMS aggregator properties document used to set up an advertising and messaging system based on a computer-implemented SMS aggregator configuration protocol, according to some embodiments.

FIG. 4B presents a sample SMS aggregator properties document 4B00 used to set up an advertising and messaging system based on a computer-implemented SMS aggregator configuration protocol. As an option, one or more instances of sample SMS aggregator properties document 4B00 or any aspect thereof may be implemented in the context of the architecture and functionality of the embodiments described herein. Also, the sample SMS aggregator properties document 4B00 or any aspect thereof may be implemented in any desired environment.

As sample aggregator properties document format (e.g., aggregators properties file $334_1$) includes the parameters as follows:

| Parameter Name | Value |
|---|---|
| <aggregatorName>_mt_param_protocol | <http or other protocol> |
| <aggregatorName>_mt_param_method | <post \| get> |
| <aggregatorName>_mt_param_auth | <basic \| form |
| <aggregatorName>_mt_param_message | <message> |
| <aggregatorName>_mt_param_mobile_number | <to> |
| <aggregatorName>_mt_param_code | <from> |
| <aggregatorName>_mt_param_response_code_start | <code> |
| <aggregatorName>_mt_param_response_code_end | </code> |
| <aggregatorName>_mt_param_response_code_success | <success code> |
| <aggregatorName>_mt_param_response_status_start | <description> |
| <aggregatorName>_mt_param_response_status_end | </description> |
| <aggregatorName>_mt_param_add_plus_to_mobile_number | <true \| false> |

-continued

| Parameter Name | Value |
| --- | --- |
| <aggregatorName>_mt_param_userid | <name \| userID> |
| <aggregatorName>_mt_param_password | <pwd \| hash> |
| <aggregatorName>_mt_custom_param_<xyz> | extensible parameter |
| <aggregatorName>_mt_param_message_template_file_name | < template file name> |

Referring to the depiction of FIG. 4B, the value of "<aggregatorName>" will be replaced by the name or other identifier of the aggregator.

Figure 5:
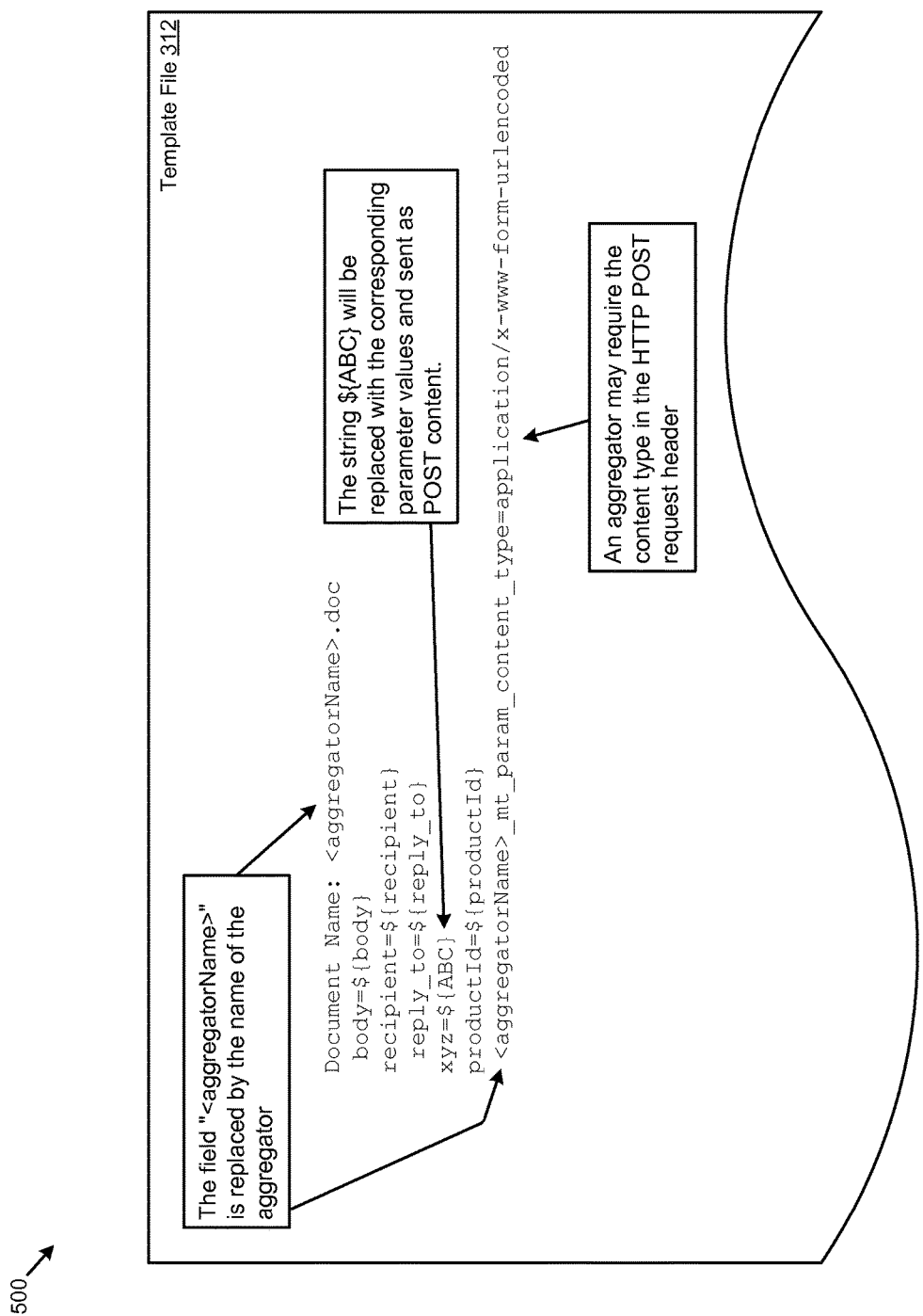
FIG. 5 presents a message template used during setup and operation of an advertising and messaging system based on a computer-implemented SMS aggregator configuration protocol, according to an embodiment.

FIG. 5 presents a message template 500 used during setup and operation of an advertising and messaging system based on a computer-implemented SMS aggregator configuration protocol. As an option, one or more instances of message template 500 or any aspect thereof may be implemented in the context of the architecture and functionality of the embodiments described herein. Also, the message template 500 or any aspect thereof may be implemented in any desired environment.

An exemplary instance of a template file 312 with content is depicted. The strings $ {ABC} are replaced with the corresponding parameter values and sent as POST content. The embodiment shown in FIG. 5 is merely one example.

Figure 6A:
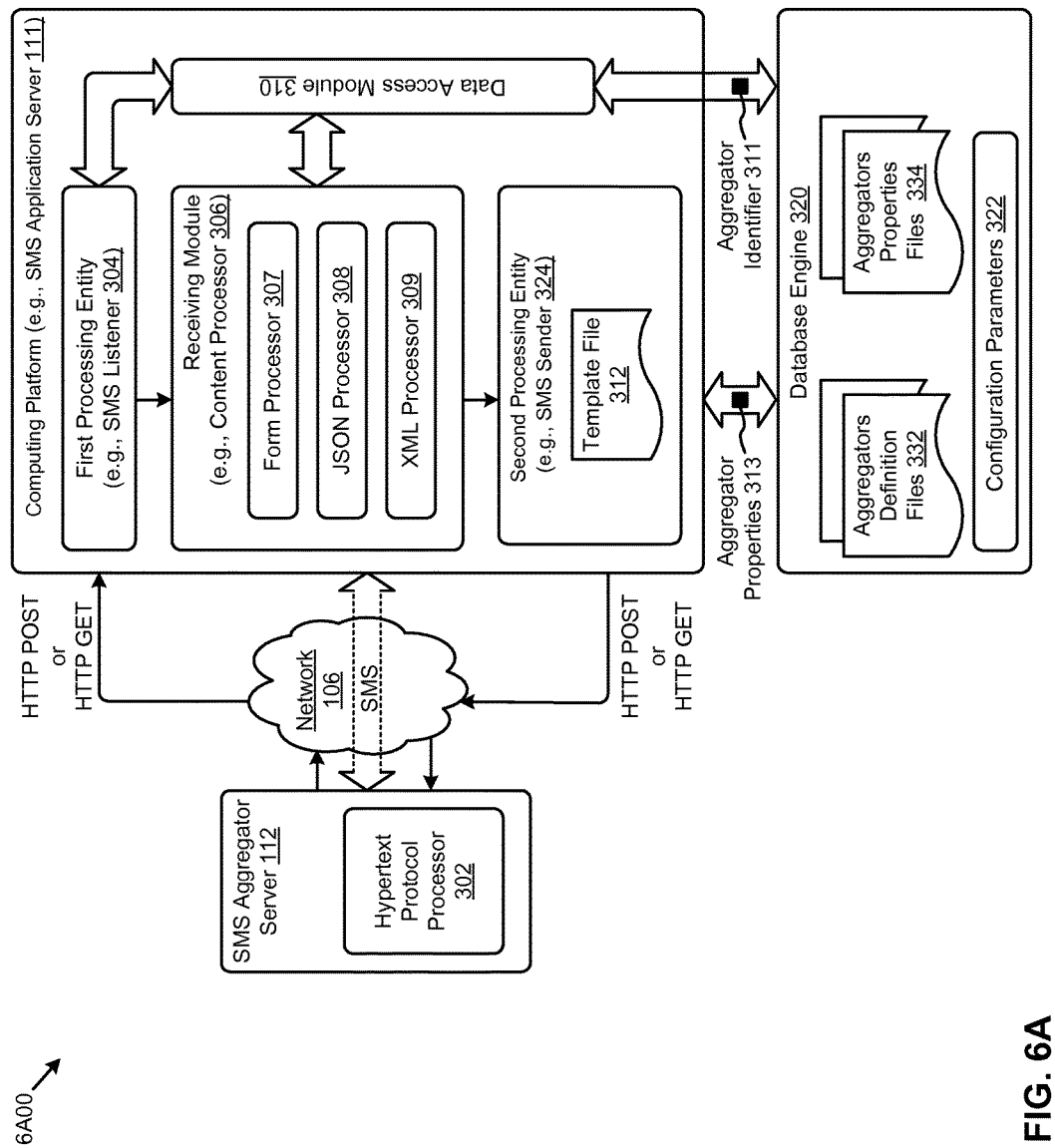
FIG. 6A is a block diagram of a system for implementing all or portions of any of the herein-disclosed embodiments.

Additional Embodiments of the Disclosure
Additional Practical Application Examples FIG. 6A is a block diagram of a system for implementing all or portions of any of the herein disclosed embodiments. The shown system 6A00 comprises a computing platform (e.g., a server, a multi-processor server, a cloud array, a processor, etc.) to receive messages over a network (e.g., an aggregator carrier network) and deliver the messages to a task executing on the computing platform. The system also comprises a receiving module comprising one or more processors (e.g., content processor 306) to receive the messages comprising a set of SMS configuration parameters such as SMS configuration parameters to identify an SMS aggregator identifier and SMS configuration parameters comprising an aggregator network type and/or an aggregator carrier name. The computing platform is configured to process an HTTP GET or HTTP POST, and then to process a form field and/or a JSON message and/or an XML string. The SMS configuration parameters are stored (e.g., using a data access module or a database engine 320) for later retrieval. The shown embodiment includes a second task (e.g., the SMS sender 324) executing on the computing platform, which is configured to format an SMS message using at least some of the SMS configuration parameters and to sending the SMS message to or through the aggregator carrier.

Figure 6B:
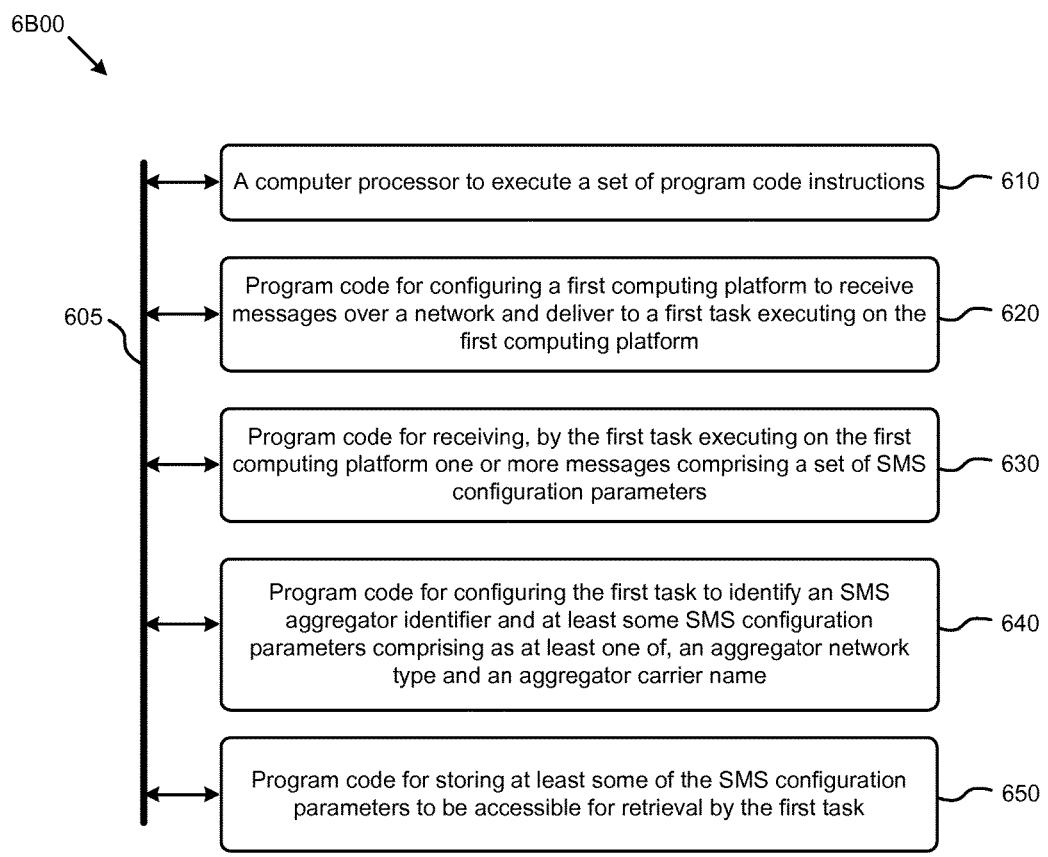
FIG. 6B is a block diagram of a system for implementing a computer program product based on any of the herein-disclosed embodiments.

FIG. 6B is a block diagram of a system for implementing a computer program product based on any of the herein-disclosed embodiments. As an option, the present system 6B00 may be implemented in the context of the architecture and functionality of the embodiments described herein. Of course, however, the system 6B00 or any operation therein may be carried out in any desired environment. As shown, system 6B00 comprises at least one processor and at least one memory, the memory serving to store program instructions corresponding to the operations of the system.

As shown, an operation can be implemented in whole or in part using program instructions accessible by a module. The modules are connected to a communication path 605, and any operation can communicate with other operations over communication path 605. The modules of the system can, individually or in combination, perform method operations within system 6B00. Any operations performed within system 6B00 may be performed in any order unless as may be specified in the claims. The embodiment of system 6B00 implements a portion of a computer system, shown as system 6B00, comprising at least one computer processor to execute a set of program code instructions (see module 610) and modules for accessing memory to hold program code instructions to perform: configuring a first computing platform to receive messages over a network and deliver to a first task executing on the first computing platform (see module 620); receiving, by the first task executing on the first computing platform one or more messages comprising a set of SMS configuration parameters (see module 630); configuring the first task to identify an SMS aggregator identifier and at least some SMS configuration parameters comprising as at least one of, an aggregator network type and an aggregator carrier name (see module 640); and storing at least some of the SMS configuration parameters to be accessible for later retrieval (see module 650).

System Architecture Overview
Additional System Architecture Examples

Figure 7A:
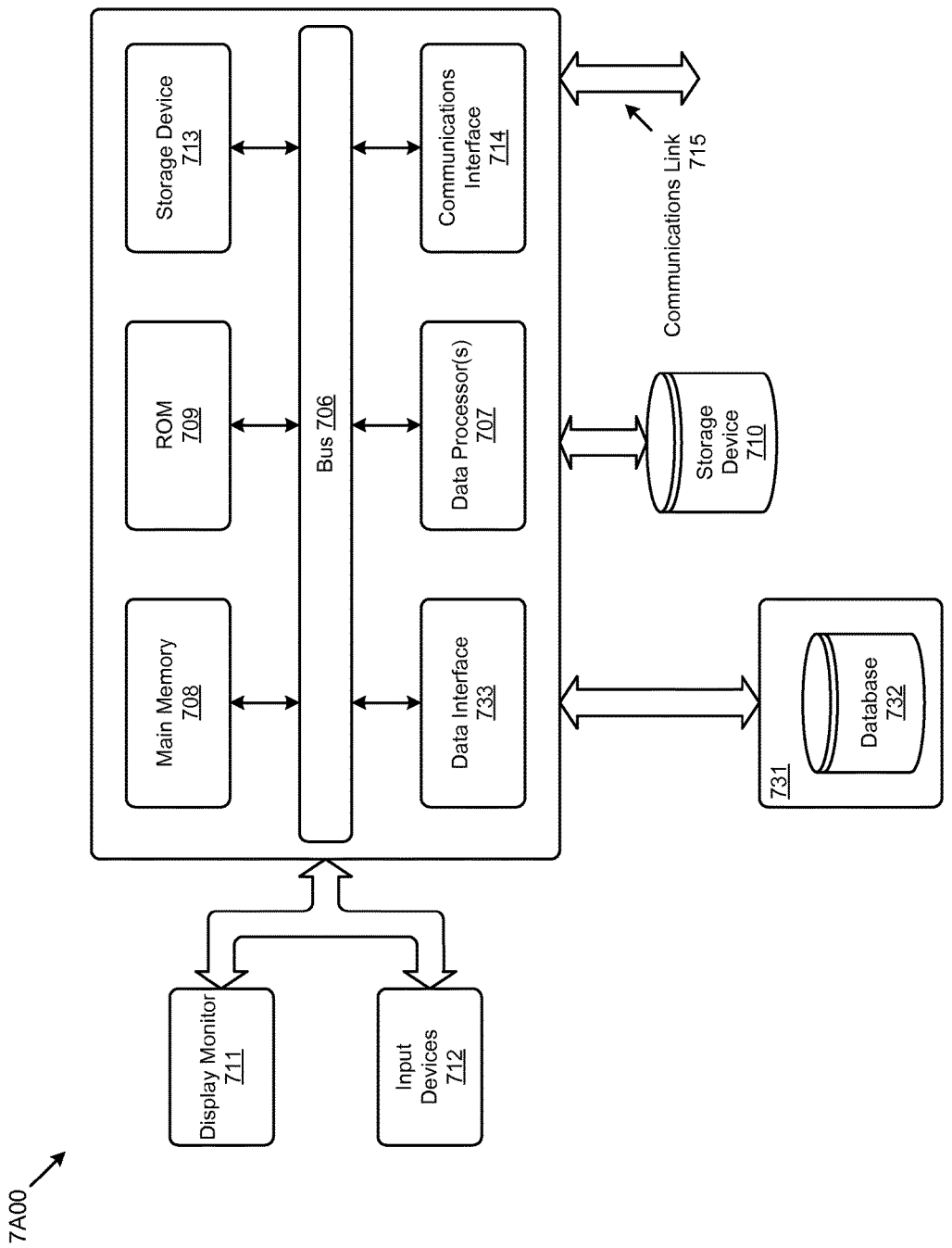
FIG. 7A, FIG. 7B, and FIG. 7C depict exemplary architectures of components suitable for implementing embodiments of the present disclosure, and/or for use in the herein-described environments.

FIG. 7A depicts a block diagram of an instance of a computer system 700 suitable for implementing embodiments of the present disclosure. Computer system 700 includes a bus 706 or other communication mechanism for communicating information, which interconnects subsystems and devices such as a processor 707, a system memory (e.g., main memory 708, or an area of random access memory RAM), a static storage device (e.g., ROM 709), a storage device 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory. Such instructions may be read into system memory from another computer readable/usable medium such as a static storage device or a disk drive. Such sequences can be organized to be accessed by one or more processing entities configured to execute a single process or configured to execute multiple concurrent processes to perform work. A processing entity can be hardware-based (e.g., involving one or more cores) or software-based or can be formed of a combination of hardware and software and can carry out computations or processing steps implemented using one or more processes, and/or one or more tasks and/or one or more threads or any combination therefrom.

The term "computer readable medium" or "computer usable medium" as used herein refers to any medium that participates in providing instructions to processor 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more instances of computer system 700 coupled by a communications link 715 (e.g., LAN, PTSN, or wireless network) may perform the sequence of instructions required to practice the disclosure in coordination with one another.

The computer system 700 may transmit and receive messages, data, and instructions including programs (e.g., application code), through communications link 715 and communication interface 714. Received program code may be executed by processor 707 as it is received and/or stored in any one or more instances of storage device 710 or any other non-volatile storage for later execution. Computer system 700 may communicate through a data interface 733 to a database 732 on an external data repository 731. Data items in database 732 can be accessed using a primary key (e.g., a relational database primary key). A module as used herein can be implemented using any mix of any portions of the system memory and any extent of hard-wired circuitry including hard-wired circuitry embodied as a processor 707. Some embodiments include one or more special-purpose hardware components (e.g., power control, logic, sensors, etc.).

Figure 7B:
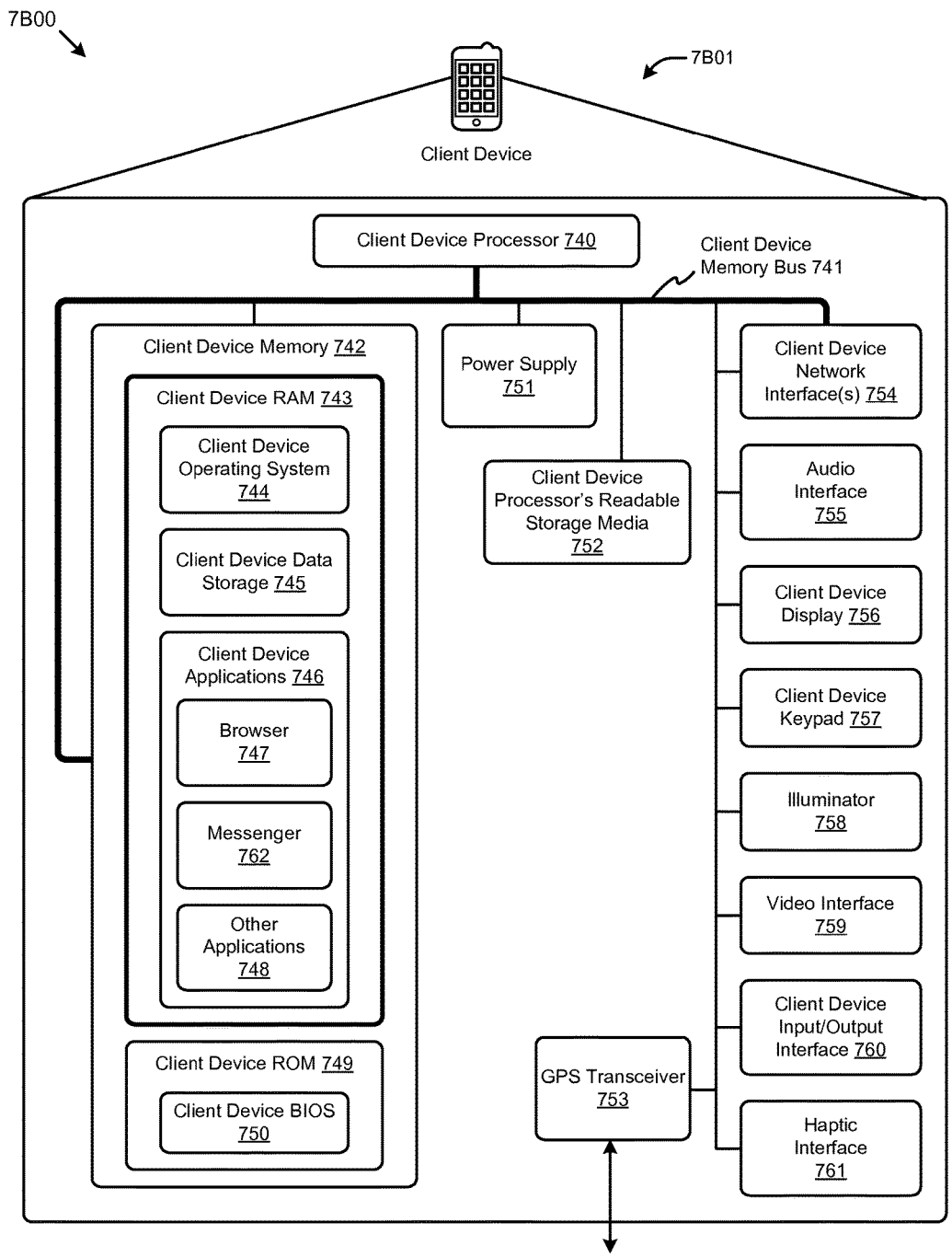

FIG. 7B depicts a block diagram 7B00 of an instance of a client device 7B01 that may be included in a system implementing instances of the herein-disclosed embodiments. Client device 7B01 may include many more or fewer components than those shown in FIG. 7B. Client device 7B01 may represent, for example, one embodiment of at least one of client devices as heretofore disclosed.

As shown in the figure, client device 7B01 includes a processor 740 in communication with a client device memory 742 via a client device memory bus 741. Client device 7B01 also includes a power supply 751, one or more client device network interfaces 754, an audio interface 755, a client device display 756, a client device keypad 757, an illuminator 758, a video interface 759, a client device input/output interface 760, a haptic interface 761, and a GPS transceiver 753 for global positioning services.

The power supply 751 provides power to client device 7B01. A rechargeable or non-rechargeable battery may be used to provide power. The power may also be provided by an external power source such as an AC adapter or a powered docking cradle that supplements and/or recharges a battery.

Client device 7B01 may optionally communicate with a base station, or directly with another computing device. A client device network interface 754 includes circuitry for coupling client device 7B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), and/or protocols such as "IEEE 802.16" Worldwide Interoperability for Microwave Access (WiMax), session initiated protocol/real-time transport protocol (SIP/RTP), or any of a variety of other wireless communication protocols. Client device network interface 754 is sometimes known as a transceiver, a transceiving device, or a network interface card (NIC).

An audio interface 755 is arranged to produce and receive audio signals such as the sound of a human voice. For example, audio interface 755 may be coupled to a speaker and microphone to enable telecommunication with others and/or generate an audio acknowledgement for some action.

A client device display 756 may be a liquid crystal display (LCD), gas plasma, light emitting diode (LED), or any other type of display used with a computing device. A client device display 756 may also include a touch sensitive screen arranged to receive input from an object such as a stylus or a digit from a human hand.

A client device keypad 757 may comprise any input device arranged to receive input from a user. For example, client device keypad 757 may include a push button numeric dial, or a keyboard. A client device keypad 757 may also include command buttons that are associated with selecting and sending images.

An illuminator 758 may provide a status indication and/or provide light. Illuminator 758 may remain active for specific periods of time or in response to events. For example, when the illuminator 758 is active, it may backlight the buttons on client device keypad 757 and stay on while the client device is powered. Also, the illuminator 758 may backlight these buttons in various patterns when particular actions are performed such as dialing another client device. An illuminator 758 may also cause light sources positioned within a transparent or translucent case of the client device to illuminate in response to actions.

A video interface 759 is arranged to capture video images such as a still photo, a video segment, an infrared video or the like. For example, the video interface 759 may be coupled to a digital video camera, a web-camera or the like. A video interface 759 may comprise a lens, an image sensor, and other electronics. Image sensors may include a complementary metal-oxide-semiconductor (CMOS) integrated circuit, charge-coupled device (CCD), or any other integrated circuit for sensing light.

Client device 7B01 also comprises a client device input/output interface 760 for communicating with external devices such as a headset, or other input or output devices not shown in FIG. 7B. The client device input/output interface 760 can use one or more communication technologies such as a USB, infrared, Bluetooth™ port or the like. A haptic interface 761 is arranged to as a human interface device (HID) to facilitate interaction with a user of a client device. Such interaction can include tactile feedback to a user of the client device. For example, the haptic interface 761 may be employed to vibrate client device 7B01 in a particular way (e.g., with a pattern or periodicity) and/or when interacting with another user.

A GPS transceiver 753 can determine the physical coordinates of client device 7B01 on the surface of the Earth. The GPS transceiver 753, in some embodiments, may be optional. The shown GPS transceiver 753 outputs a location such as a latitude value and a longitude value. However, the GPS transceiver 753 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 7B01 on the surface of the Earth. It is understood that under different conditions, a GPS transceiver 753 can determine a physical location within millimeters for client device 7B01; and in other cases, the determined physical location may be less precise such as within a meter or significantly greater distances. In one embodiment, however, the client device 7B01 may provide other information that may be employed to determine a physical location of the device including, for example, a media access control (MAC) address, IP address, IP port identifier, or the like.

The client device memory 742 includes random access memory 743, read-only memory 749, and other storage means. The client device memory 742 illustrates an example of computer readable storage media (devices) for storage of information such as computer readable instructions, data structures, program modules or other data. The client device memory 742 stores a basic input/output system (BIOS) in the embodiment of client device BIOS 750 for controlling low-level operation of client device 7B01. The memory also stores an operating system 744 for controlling the operation of client device 7B01. It will be appreciated that this component may include a general-purpose operating system such as a version of UNIX, or LINUX™, or a specialized client communication operating system such as Microsoft Corporation's Windows Mobile™, Apple Corporation's iOS™ Google Corporation's Android™, or the Symbian® operating system. The operating system may include, or interface with a Java virtual machine module that enables control of hardware components and/or operating system operations via Java application programs.

The client device memory 742 further includes one or more instances of client device data storage 745, which can be used by client device 7B01 to store, among other things, client device applications 746 and/or other data. For example, client device data storage 745 may also be employed to store information that describes various capabilities of client device 7B01. The information may then be provided to another device based on any of a variety of events including being sent as part of a header during a communication, sent upon request or the like. Client device data storage 745 may also be employed to store social networking information including address books, buddy lists, aliases, user profile information or the like. Further, client device data storage 745 may also store messages, web page content, or any of a variety of content (e.g., received content, user generated content, etc.).

At least a portion of the information may also be stored on another component or network device including, but not limited, to a client device processor's readable storage media 752, a disk drive or other computer readable storage devices within client device 7B01.

An instance of a client device processor's readable storage media 752 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media 752 may also be referred to herein as computer readable storage media.

Client device applications 746 may include computer executable instructions which, when executed by client device 7B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 746 may include, for example, a messenger 762, a browser 747, and other applications 748. Other applications 748 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 748 may collect and store user data that may be received from other computing devices in the environment.

A messenger 762 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in one embodiment, the messenger 762 may be configured as an IM application such as AOL (America Online) instant messenger, Yahoo! messenger, .NET messenger server, ICQ ("I seek you") or the like. In one embodiment, the messenger 762 may be configured to include a mail user agent (MUA) such as Elm, Pine, message handling (MH), Outlook, Eudora, Mac Mail, Mozilla Thunderbird or the like. In another embodiment, the messenger 762 may be a client device application that is configured to integrate and employ a variety of messaging protocols including, but not limited, to various push and/or pull mechanisms for client device 7B01. In one embodiment, the messenger 762 may interact with the browser 747 for managing messages. As used herein, the term "message" refers to any of a variety of messaging formats, or communications form including, but not limited to, email, SMS, IM, MMS, IRC or the like.

A browser 747 may include virtually any application configured to receive and display graphics, text, multimedia, messages and the like, employing virtually any web based language. In one embodiment, the browser application is enabled to employ HDML, WML, WMLScript, JavaScript, SGML, HTML, XML and the like, to display and send a message. However, any of a variety of other web-based programming languages may be employed. In one embodiment, a browser 747 may enable a user of client device 7B01 to communicate with another network device as may be present in the environment.

Figure 7C:
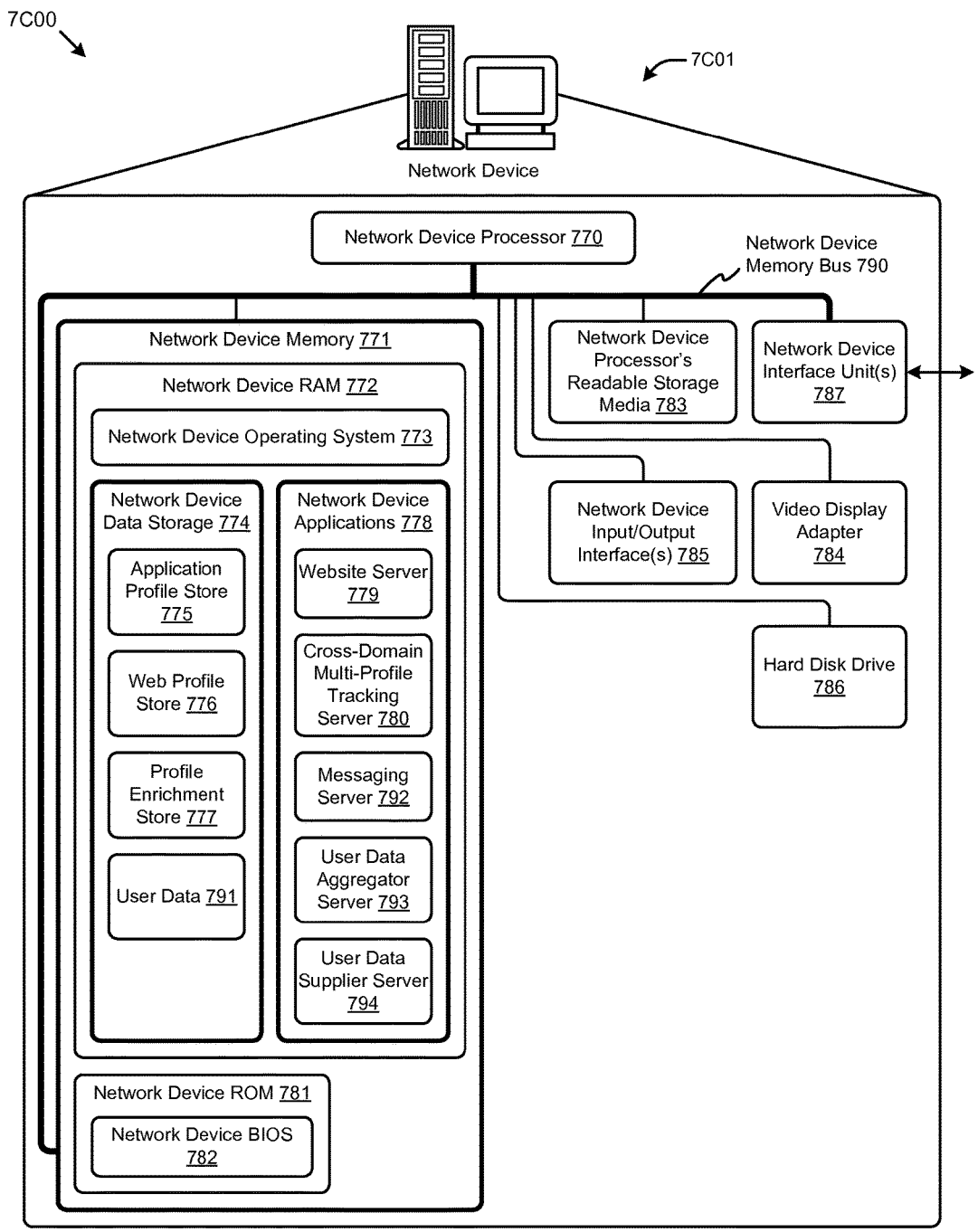

FIG. 7C depicts a block diagram 7C00 of an instance of a network device 7C01 that may be included in a system implementing instances of the herein-disclosed embodiments. Network device 7C01 may include many more or fewer components than those shown. Network device 7C01 may be configured to operate as a server, client, peer, a host, or any other device.

Network device 7C01 includes at least one network device processor 770, instances of readable storage media 783, network interface(s) 787, a network device input/output interface 785, a hard disk drive 786, a video display adapter 784, and a network device memory 771, all in communication with each other via a network device memory bus 790. The network device memory generally includes network device RAM 772, network device ROM 781. Some embodiments include one or more non-volatile mass storage devices such as a hard disk drive 786, a tape drive, an optical drive, and/or a floppy disk drive. The network device memory stores a network device operating system 773 for controlling the operation of network device 7C01. Any general-purpose operating system may be employed. A basic input/output system (BIOS) is also provided in the form of network device BIOS 782 for controlling the low-level operation of network device 7C01. As illustrated in FIG. 7C, a network device 7C01 also can communicate with the Internet, or some other communications network, via a network interface unit 787, which is constructed for use with various communication protocols including the TCP/IP protocol. The network interface unit 787 is sometimes known as a transceiver, a transceiving device, or a network interface card (NIC).

Network device 7C01 also comprises a network device input/output interface 785 for communicating with external devices such as a keyboard or other input or output devices. A network device input/output interface 785 can use one or more communication technologies such as USB, infrared, Bluetooth™ or the like.

The storage devices as described above may use various types of computer readable media, namely non-volatile computer readable storage media and/or a client device processor's readable storage media 783 and/or a network device processor's readable storage media 783. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 774 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 774 may further include program code, data, algorithms and the like, for use by a processor such as a network device processor 770 to execute and perform actions. In one embodiment, at least some of the logical contents of network device data storage 774 might be stored on another component of network device 7C01, such as on a second instance of hard disk drive 786 or on an external/removable storage device.

Network device data storage 774 may further store any portions of application data and/or user data such as an application profile store 775, a web profile store 776, a profile enrichment store 777 and/or any user data collected. In some embodiments, user data 791 may store unique user data, non-unique user data, aggregated user data, and/or any combination thereof. User data 791 may include a variety of attributes such as a five digit zip code, an expanded nine digit zip code and the like.

The Network device data storage 774 may also store program code and data. One or more network device applications 778 may be loaded into network device data storage or any other mass memory, to be accessible to run with or as a part of network device operating system 773. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 792, website server 779, user data aggregator server 793, a cross-domain multi-profile tracking server 780, and/or user data supplier server 794 may also be included as application programs within applications 778.

A messaging server 792 may include virtually any computing component or components configured and arranged to forward messages from message user agents and/or other message servers, or to deliver messages to a local message store such as network device data storage 774 or the like. Thus, a messaging server 792 may include a message transfer manager to communicate a message employing any of a variety of email protocols including, but not limited to, simple mail transfer protocol (SMTP), post office protocol (POP), Internet message access protocol (IMAP), network new transfer protocol (NNTP) or the like. A messaging server 792 may also be managed by one or more components of the messaging server 792. Thus, the messaging server 792 may also be configured to manage SMS messages; IM, MMS, IRC, or RSS feeds; mIRC; or any of a variety of other message types. In one embodiment, the messaging server 792 may enable users to initiate and/or otherwise conduct chat sessions, VOIP sessions or the like.

A website server 779 may represent any of a variety of information and services that are configured to provide content, including messages, over a network to another computing device. Thus, a website server 779 can include, for example, a web server, a file transfer protocol (FTP) server, a database server, a content server or the like. A website server 779 may provide the content including messages over the network using any of a variety of formats including, but not limited to WAP, HDML, WML, SGML, HTML, XML, compact HTML (cHTML), extensible HTML (xHTML) or the like. A website server 779 may also be configured to enable a user of a client device to browse websites, upload user data, view and interact with advertisements or the like.

A user data aggregator server 793 is configured to aggregate user data to be provided to user data buyers for advertising campaigns. In one embodiment, a user data aggregator server 793 may be configured to receive collected user data from a user data supplier server 794. In some embodiments, a user data aggregator server 793 may receive a query for user data. Based on the query, a user data aggregator server 793 may generate a plurality of subsets of aggregated user data. In some embodiments, user data aggregator server 793 may be included in a network device.

A user data supplier server 794 is configured to collect user data. In one embodiment, the user data supplier server 794 may be configured to provide the collected user data to user data aggregator server 793. In some embodiments, the user data supplier server 794 may collect and/or provide unique user data and/or non-unique user data. In one embodiment, the user data supplier server 794 may aggregate the collected user data. In some embodiments, the user data supplier server 794 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network including any sub-networks and/or wireless networks are in communication with, and enables communication between each of the components the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In one embodiment, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In one embodiment, a user of the client device may employ the browser application to perform various activities over a network (online). However, another application may also be used to perform various online activities.

Client devices may include at least one client application that is configured to receive and/or send data between another computing device (e.g., a server component). The client application may include a capability to provide send and/or receive content or the like. The client application may further provide information that identifies itself including a type, capability, name or the like. In one embodiment, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In one embodiment, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between another computing device or network.

Any of the foregoing networks can be configured to couple network devices with other computing devices and communication can include communicating between the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices could be remotely connected to either LANs or WANs via a modem and temporary telephone link. In one embodiment, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A system to support a plurality of short message service (SMS) aggregators comprising:
    a computing platform comprising an application messaging server that interfaces with a plurality of SMS aggregators to receive one or more messages over a network, the computing platform having a first processing entity executing on the computing platform, the plurality of SMS aggregators corresponding to different configuration settings for integration with the application messaging server, the application messaging server corresponding to an aggregator definition dataset and an aggregator property dataset, where the aggregator definition dataset corresponds to definition data associated with the plurality of SMS aggregators and the aggregator property dataset corresponds to configuration properties associated with the plurality of SMS aggregators;
    a receiving module comprising one or more processors to receive the one or more messages, wherein the one or more messages comprise a set of SMS configuration parameters for a specific SMS aggregator, at least some of the set of SMS configuration parameters to identify the aggregator definition dataset and the aggregator property dataset with the set of SMS configuration parameters to include an SMS aggregator identifier and the at least some of the set of SMS configuration parameters comprising at least one of, an aggregator network type, and an aggregator carrier name;
    a data access module corresponding to one or more storage devices, wherein the data access module stores the aggregator definition dataset and the aggregator property dataset having the SMS aggregator identifier and the at least some of the set of SMS configuration parameters, the aggregator definition dataset and the aggregator property dataset stored into the one or more storage devices accessible by the application messaging server; and
    a data access module corresponding to one or more processing elements, to generate a message object to be sent from the application messaging server through the specific SMS aggregator by accessing the aggregator definition dataset and the aggregator property dataset, wherein at least some of the set of SMS configuration parameters are used to format the message object.

2. The system of claim 1, wherein the receiving module receives, from the SMS aggregator identified by the SMS aggregator identifier, a relay of at least a portion of an SMS message that originated from a mobile device, the receiving module configures the aggregator definition dataset and the aggregator property dataset without performing SMS aggregator specific code changes, and SMS configuration parameters map input parameters, output parameters, and processing parameters for SMS messaging to SMS aggregator subscribers through the SMS aggregators.

3. The system of claim 2, wherein the relay of at least a portion of an SMS message that originated from a mobile device comprises processing at least one of, a form field, a JSON message, and an XML string.

4. The system of claim 2, further comprising a sending module, to format an SMS message to the SMS aggregator identified by the SMS aggregator identifier.

5. The system of claim 1, wherein the message object comprises at least a mobile device identifier.

6. The system of claim 5, wherein the message object comprises a at least one broadcast message having a short code and the aggregator carrier name.

7. A computer program product, embodied in a non-transitory computer readable medium, the computer readable medium having stored thereon a sequence of instructions which, when executed by a processor causes the processor to execute a process to support a plurality of short message service (SMS) aggregators, the process comprising:
    configuring a computing platform comprising an application messaging server that interfaces with a plurality of SMS aggregators to receive messages over a network, the computing platform having a first processing entity executing on the computing platform, the plurality of SMS aggregators corresponding to different configuration settings for integration with the application messaging server, the application messaging server corresponding to an aggregator definition dataset and an aggregator property dataset, where the aggregator definition dataset corresponds to definition data associated with the plurality of SMS aggregators and the aggregator property dataset corresponds to configuration properties associated with the plurality of SMS aggregators;
    receiving, by the first processing entity executing on the computing platform, one or more messages comprising a set of SMS configuration parameters for a specific SMS aggregator;
    configuring the aggregator definition dataset and the aggregator property dataset with the set of SMS configuration parameters to include an SMS aggregator identifier and at least some of the set of SMS configuration parameters comprising as at least one of, an aggregator network type, and an aggregator carrier name;
    storing the aggregator definition dataset and the aggregator property dataset having the SMS aggregator identifier and the at least some of the set of SMS configuration parameters, the aggregator definition dataset and the aggregator property dataset accessible for retrieval by the first processing entity; and
    accessing the aggregator definition dataset and the aggregator property dataset to generate a message object sent from the application messaging server through the specific SMS aggregator, wherein at least some of the set of SMS configuration parameters are used to format the message object.

8. The system of claim 1, wherein the one or more messages are received over a network during a configuration session while there are remaining parameters to configure, the application messaging server acknowledges an end of the configuration session and indicates readiness to prosecute a campaign, and wherein the configuration session is initiated after successful completion of an authentication session.

9. A method implemented on a computing platform having a processing entity to support a plurality of short message service (SMS) aggregators, the method comprising:
maintaining an application messaging server that interfaces with a plurality of SMS aggregators, the plurality of SMS aggregators corresponding to different configuration settings for integration with the application messaging server, the application messaging server corresponding to an aggregator definition dataset and an aggregator property dataset, where the aggregator definition dataset corresponds to definition data associated with the plurality of SMS aggregators and the aggregator property dataset corresponds to configuration properties associated with the plurality of SMS aggregators;
connecting to a network;
receiving one or more messages comprising a set of SMS configuration parameters for a specific SMS aggregator;
configuring the aggregator definition dataset and the aggregator property dataset with the set of SMS configuration parameters to include an SMS aggregator identifier and at least some of the set of SMS configuration parameters comprising as at least one of, an aggregator network type, and an aggregator carrier name;
storing the aggregator definition dataset and the aggregator property dataset having the SMS aggregator identifier and the at least some of the set of SMS configuration parameters, the aggregator definition dataset and the aggregator property dataset accessible by the computing platform; and
accessing the aggregator definition dataset and the aggregator property dataset to generate a message object sent from the application messaging server through the specific SMS aggregator, wherein the at least some of the set of SMS configuration parameters are used to format the message object.

10. The method of claim 9, further comprising receiving, from the SMS aggregator identified by the SMS aggregator identifier, a relay of at least a portion of an SMS message that originated from a mobile device, configuring the aggregator definition dataset and the aggregator property dataset is performed without performing SMS aggregator specific code changes, and SMS configuration parameters map input parameters, output parameters, and processing parameters for SMS messaging to SMS aggregator subscribers through the SMS aggregators.

11. The method of claim 10, further comprising sending, to the SMS aggregator identified by the SMS aggregator identifier at least a portion of an SMS message destined for the mobile device.

12. The method of claim 10, wherein the relay of at least a portion of an SMS message originated from a mobile device is processed by a second processing entity configured to process at least one of, a form field, a JSON message, and an XML string.

13. The method of claim 10, wherein the message object comprises at least a mobile device identifier.

14. The method of claim 13, further comprising receiving a short code within an SMS message sent from the mobile device corresponding to the mobile device identifier.

15. The method of claim 13, further comprising receiving a long code within an SMS message sent from the mobile device corresponding to the mobile device identifier.

16. The computer program product of claim 7, further instructions for comprising receiving a short code within an SMS message sent from a mobile device corresponding to a mobile device identifier.

17. The computer program product of claim 7, further comprising instructions for sending, to the SMS aggregator identified by the SMS aggregator identifier, at least a portion of an SMS message destined for a mobile device.

18. The computer program product of claim 7, further comprising instructions for receiving, from the SMS aggregator identified by the SMS aggregator identifier, a relay of at least a portion of an SMS message that originated from a mobile device, configuring the aggregator definition dataset and the aggregator property dataset is performed without performing SMS aggregator specific code changes, and SMS configuration parameters map input parameters, output parameters, and processing parameters for SMS messaging to SMS aggregator subscribers through the SMS aggregators.

19. The computer program product of claim 7, wherein the message object comprises at least a mobile device identifier.

20. The computer program product of claim 19, wherein at least a portion of an SMS message that originated from a mobile device is processed by a second processing entity configured to process at least one of, a form field, a JSON message, and an XML string.

* * * * *

UNITED STATES PATENT AND TRADEMARK OFFICE
CERTIFICATE OF CORRECTION

PATENT NO. : 9,917,810 B2
APPLICATION NO. : 14/564658
DATED : March 13, 2018
INVENTOR(S) : Kalyanaraman et al.

Page 1 of 1

It is certified that error appears in the above-identified patent and that said Letters Patent is hereby corrected as shown below:

In the Specification

In Column 11, Line 6, delete "PTSN," and insert -- PSTN, --, therefor.

Signed and Sealed this
Twenty-eighth Day of August, 2018

Andrei Iancu
*Director of the United States Patent and Trademark Office*